Figure 3A:
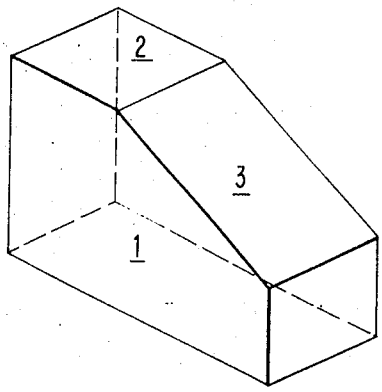
Figure 3B:
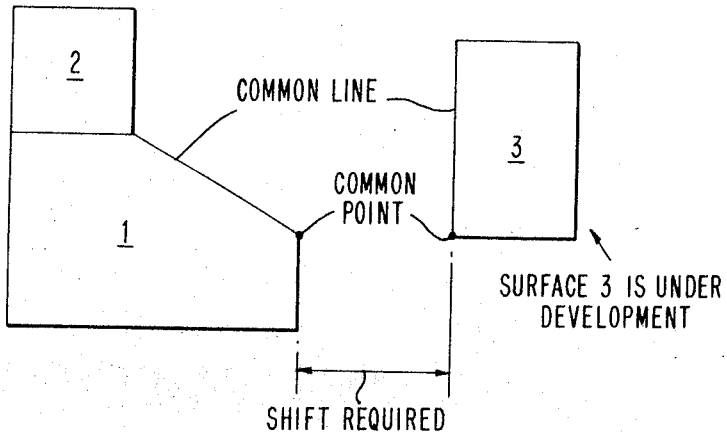
Figure 3C:
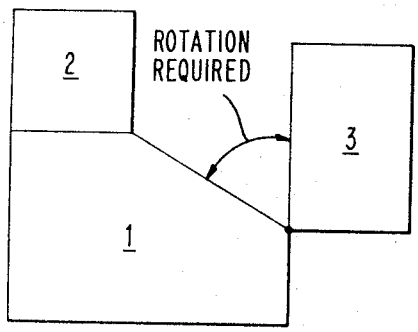
Figure 3D:
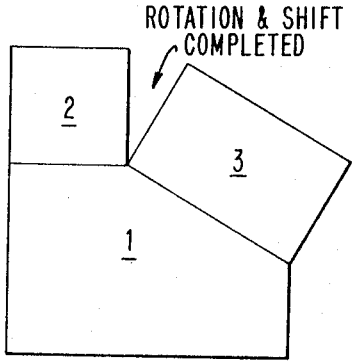
Figure 4A:
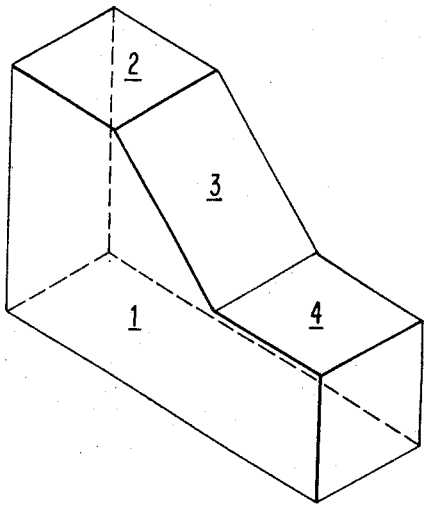
Figure 4B:
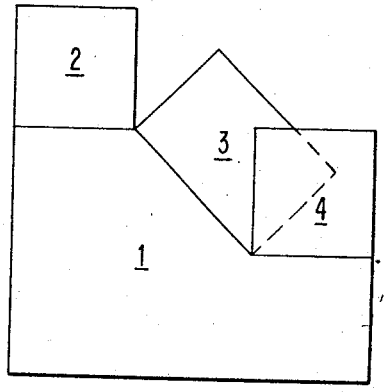
Figure 4C:
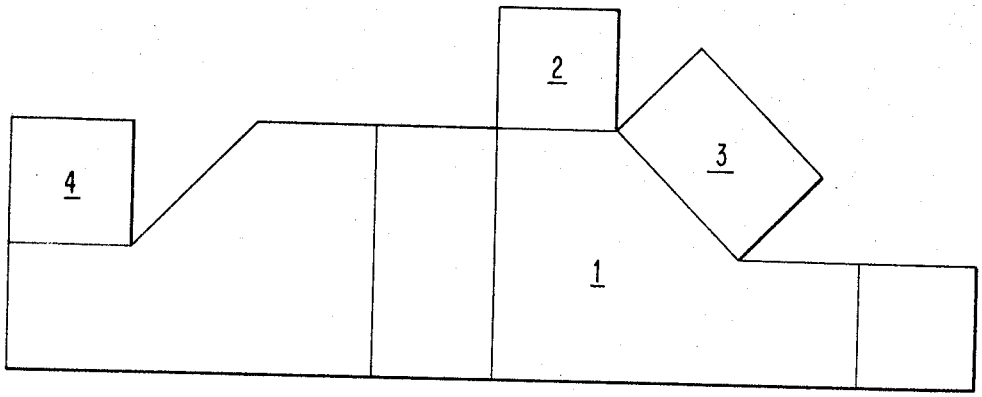
Figure 5A:
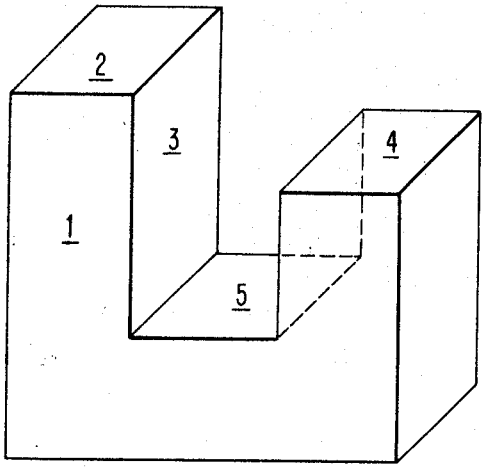
Figure 5B:
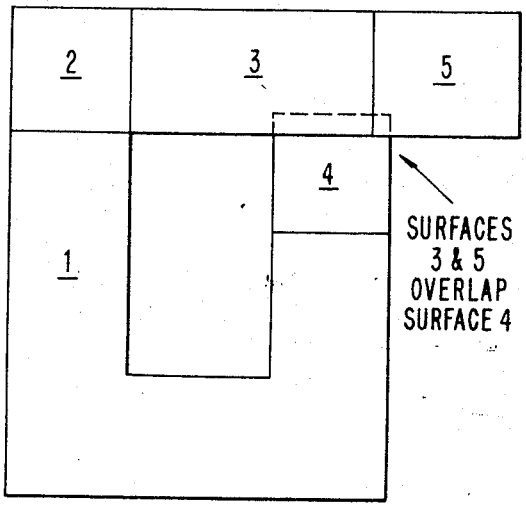
Figure 5C:
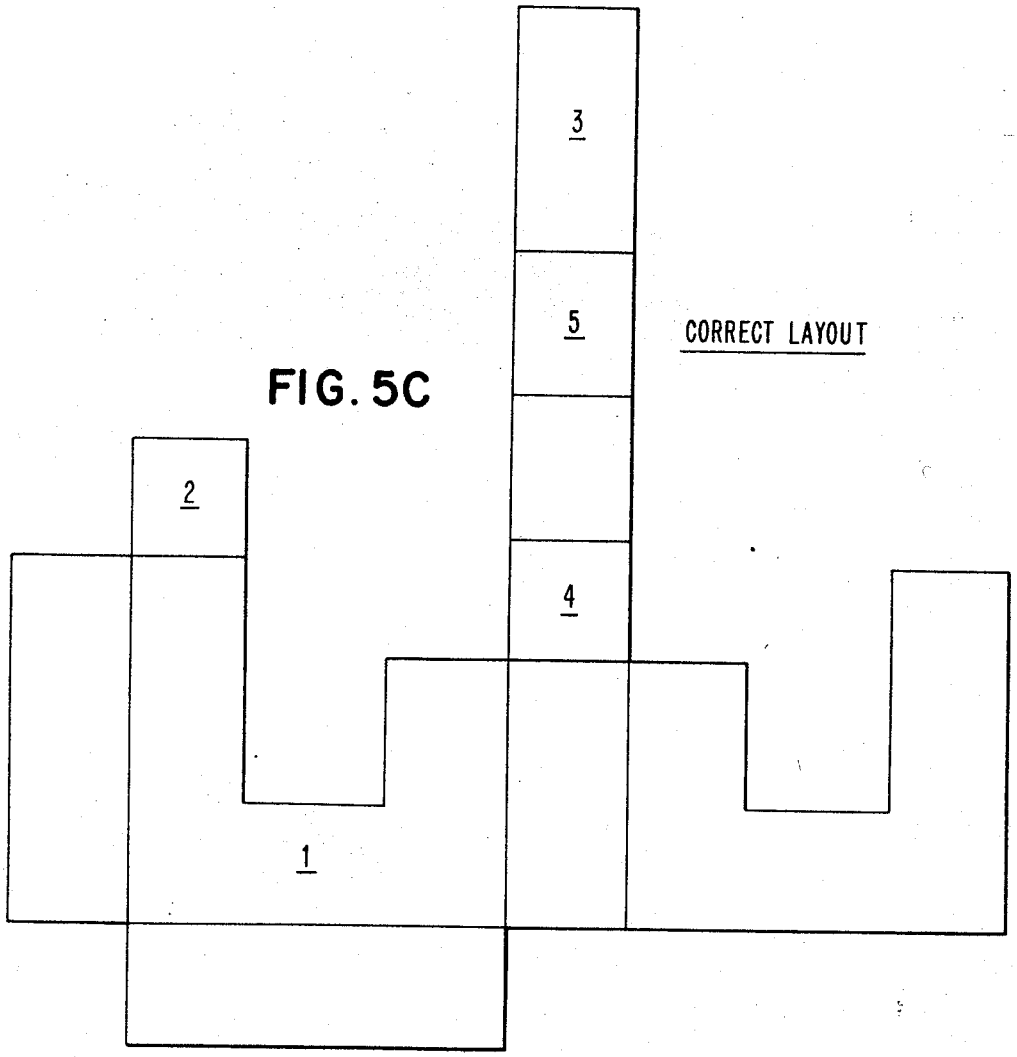
Figure 8A:
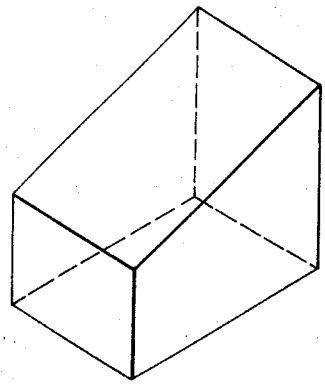
Figure 8B:
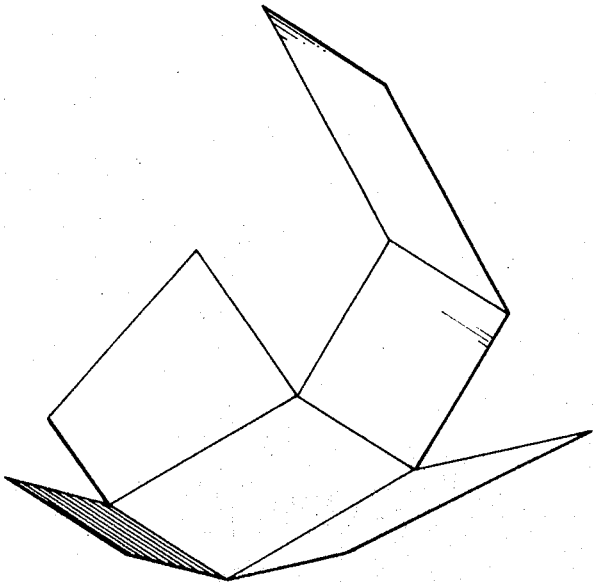
Figure 8C:
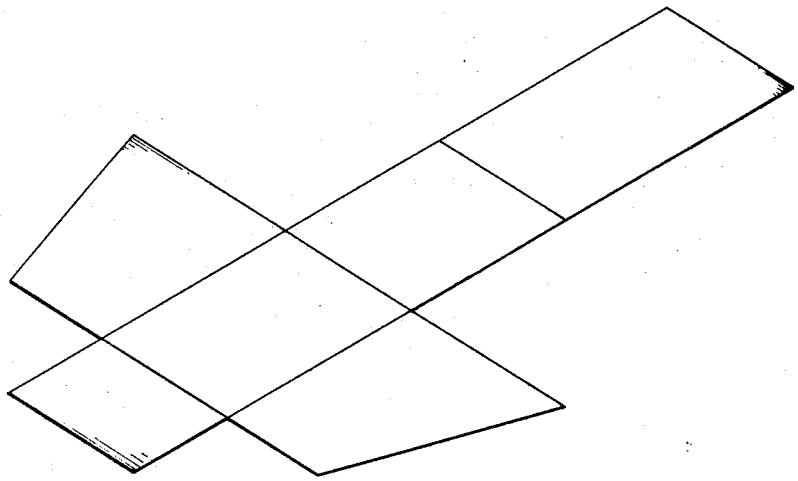
Figure 9A:
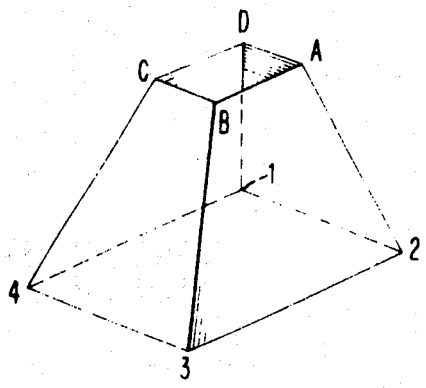
Figure 9B:
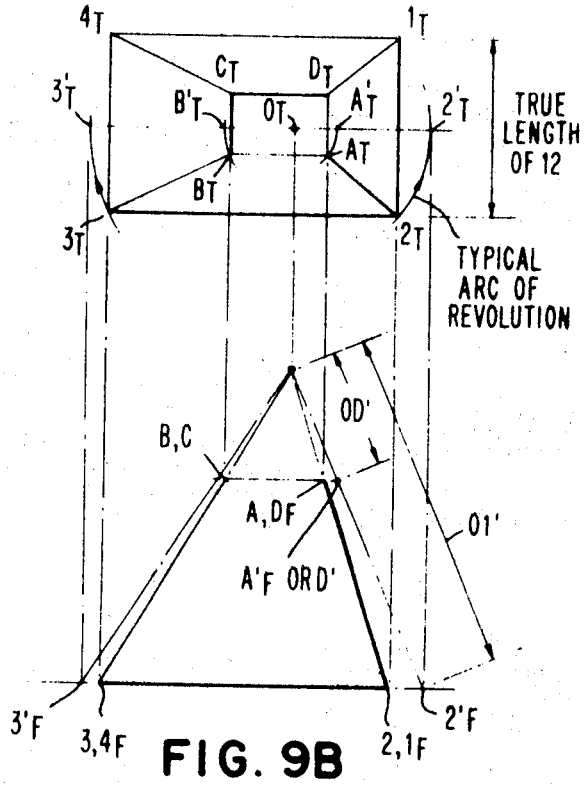
Figure 9C:
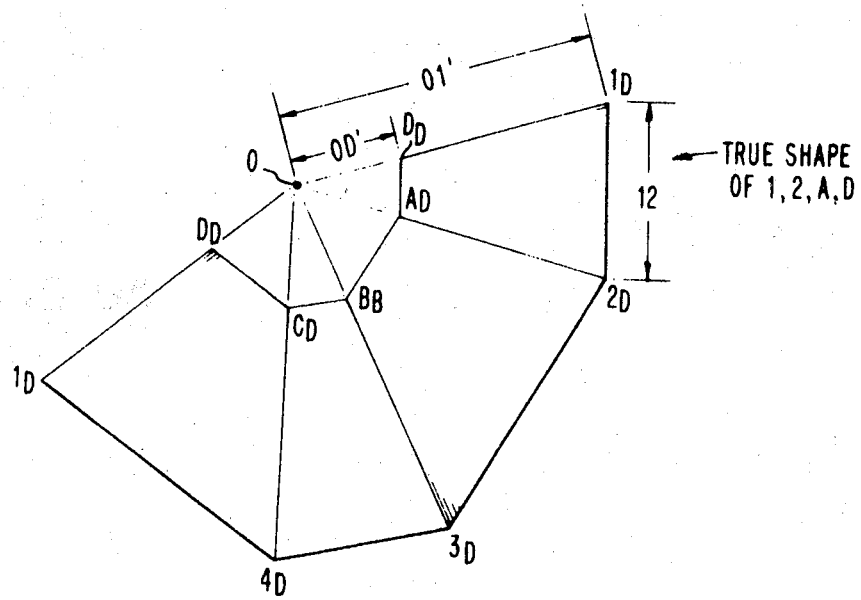
Figure 10A:
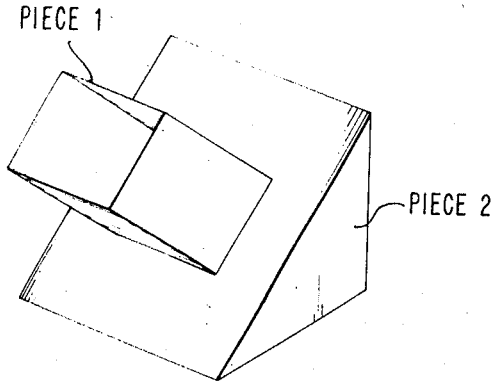
Figure 10B:
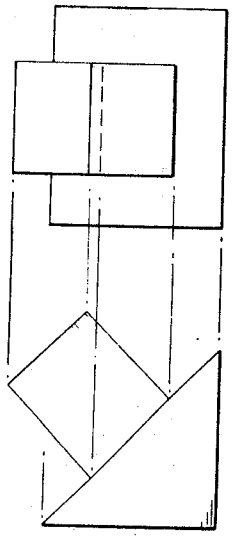
Figure 10C:
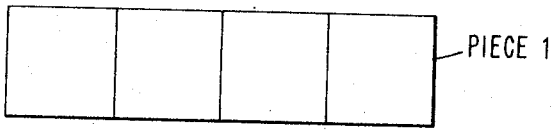
Figure 10D:
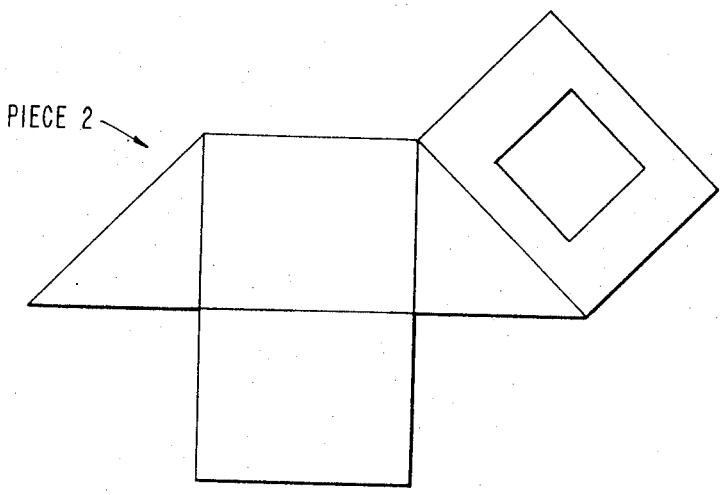
Figures 11, 11A, 11F:
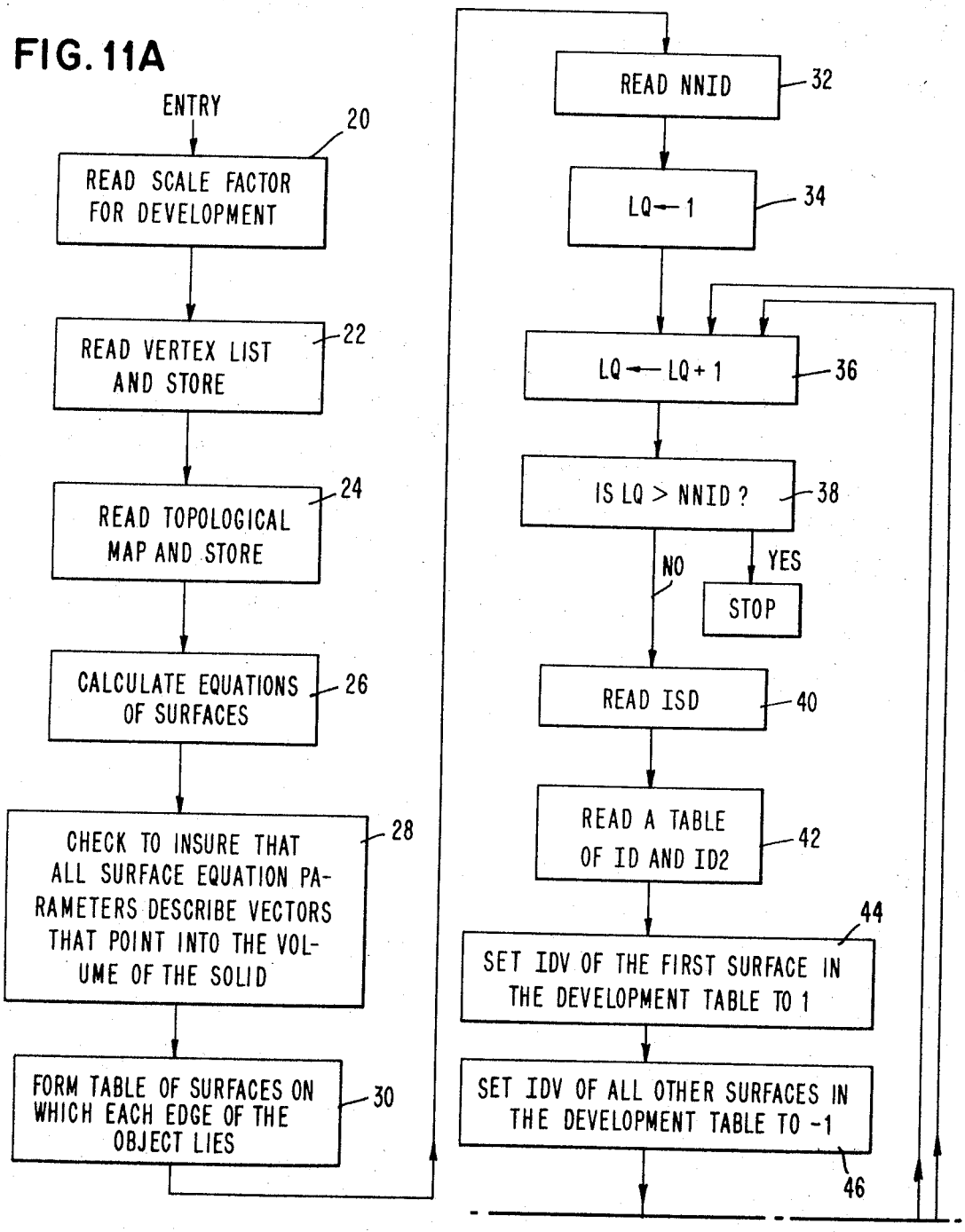
Figure 11B:
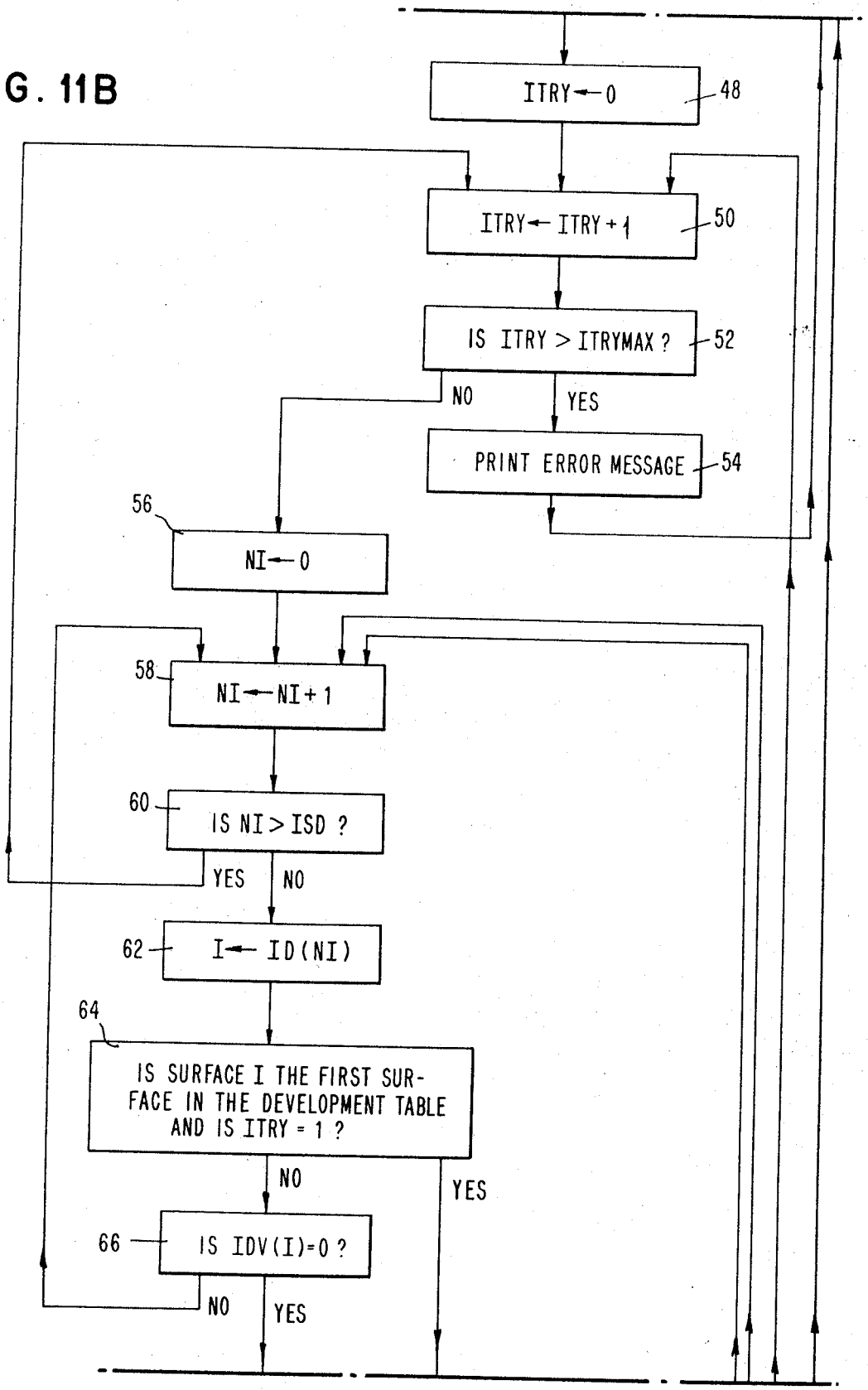
Figure 11C:
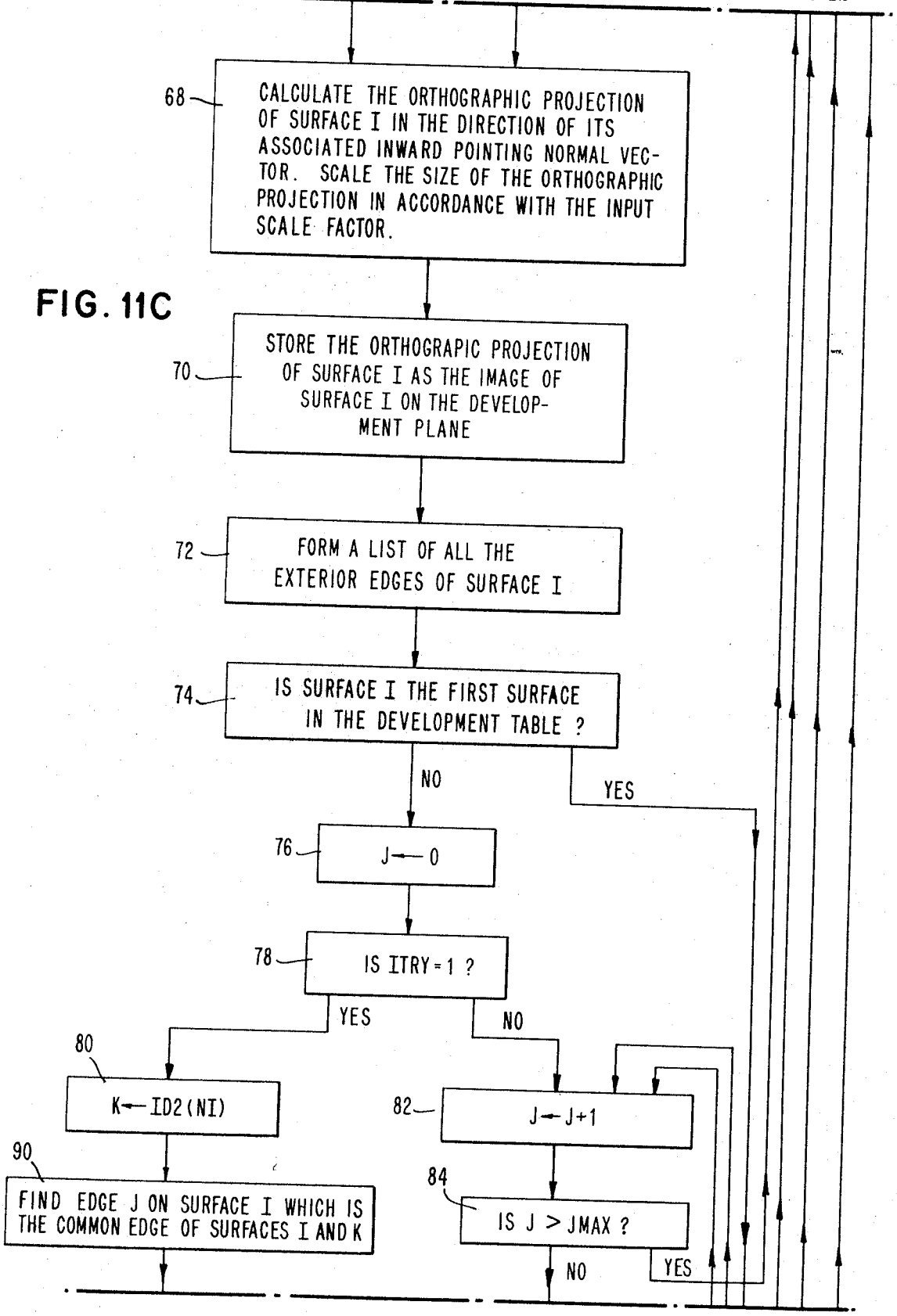
Figure 11D:
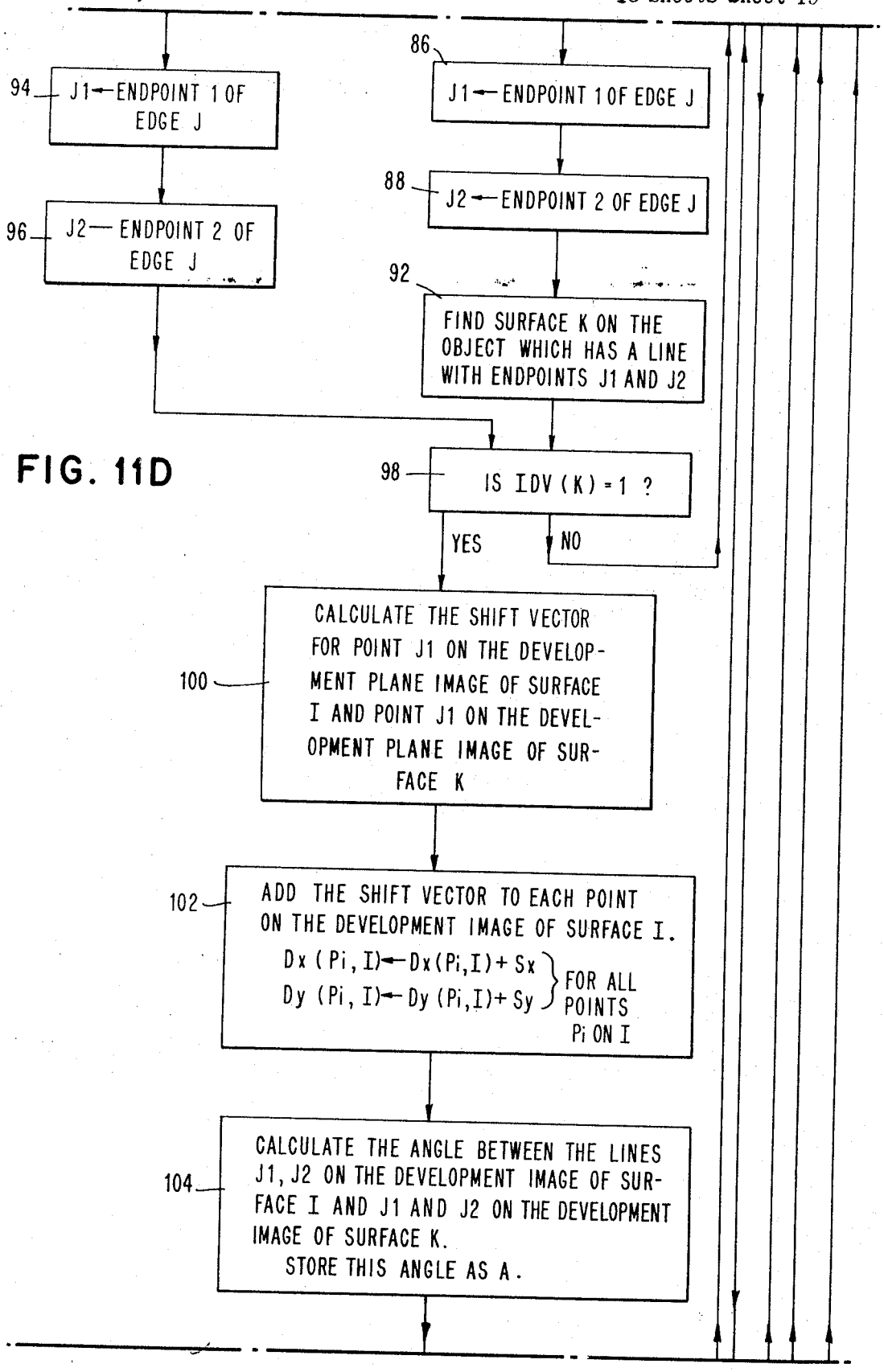
Figure 11E:
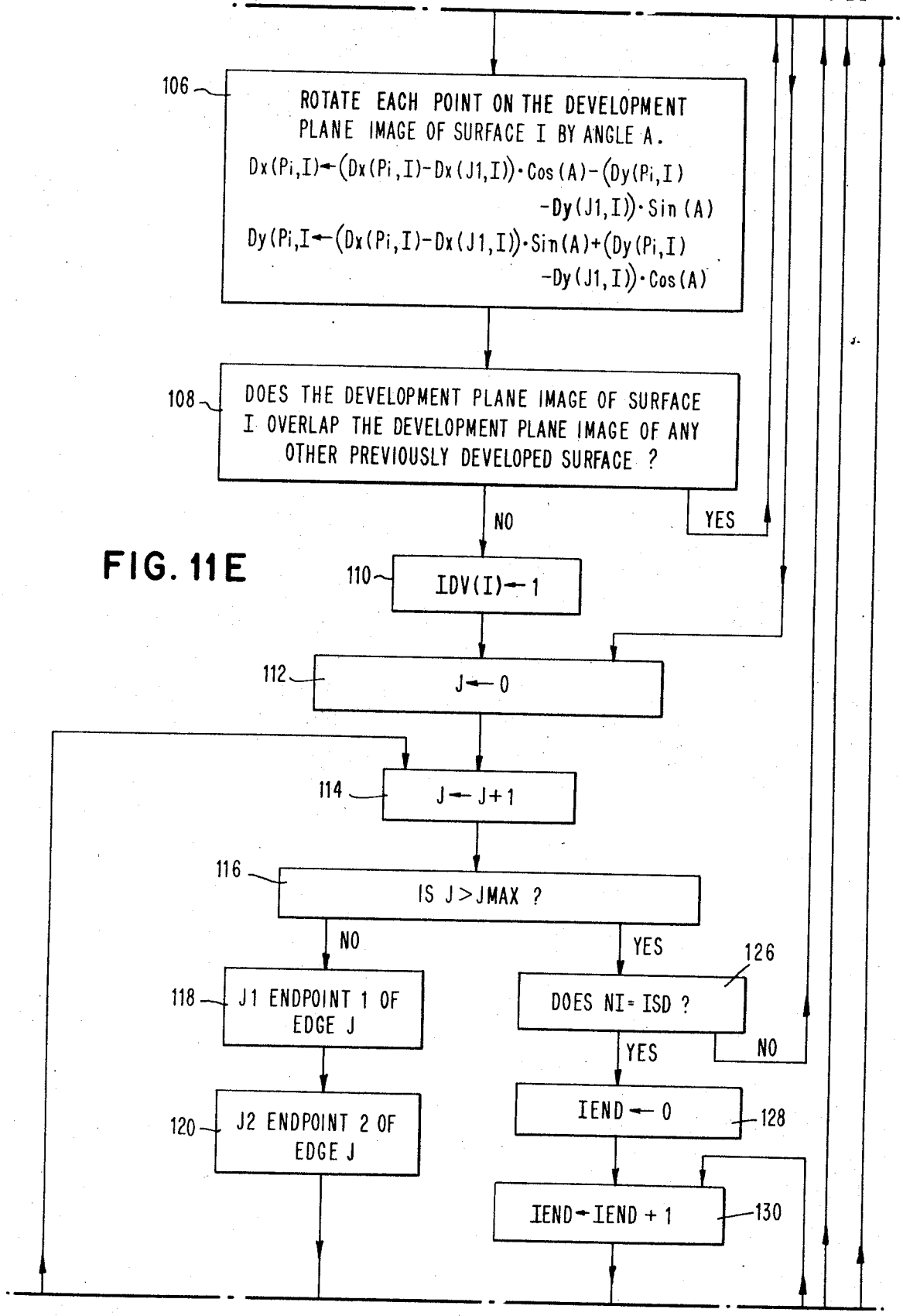
Figure 11F:
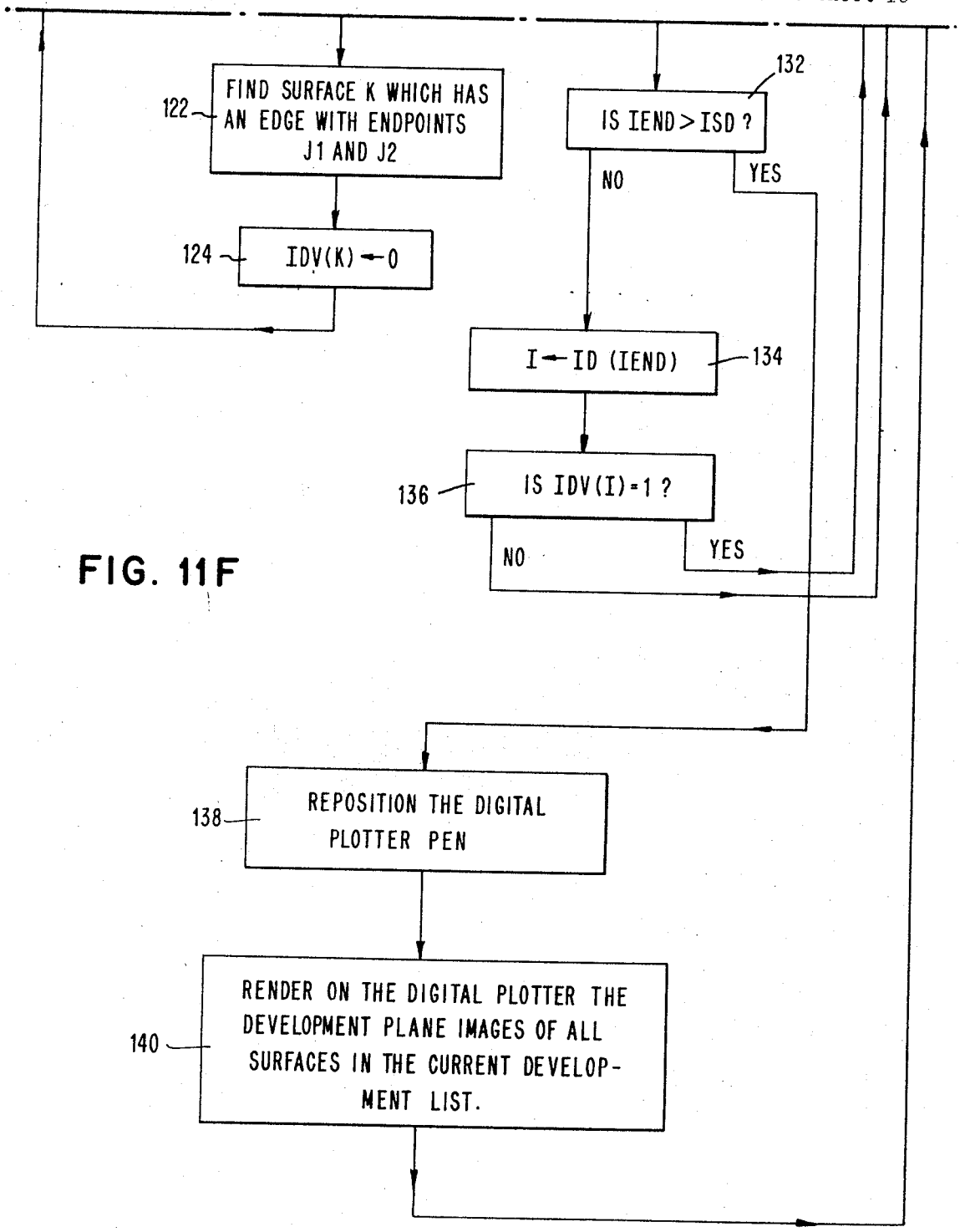
Figure 12:
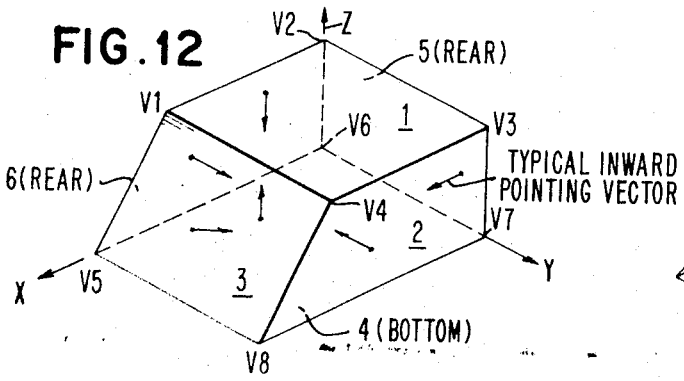
Figure 13A:
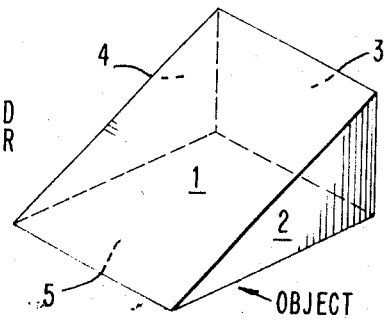
Figure 13B:
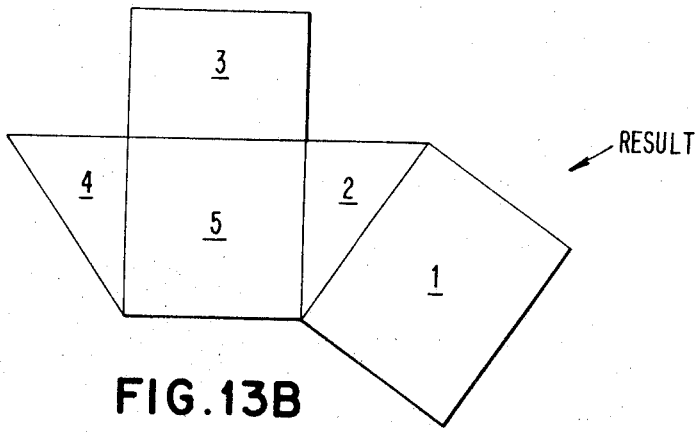
Figure 14:
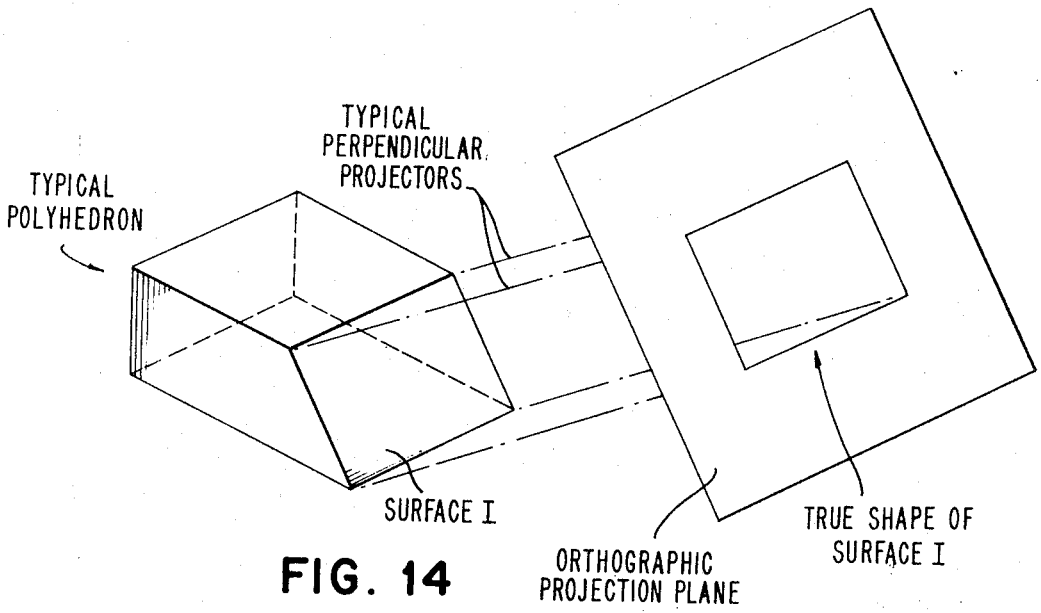
Figure 15A:
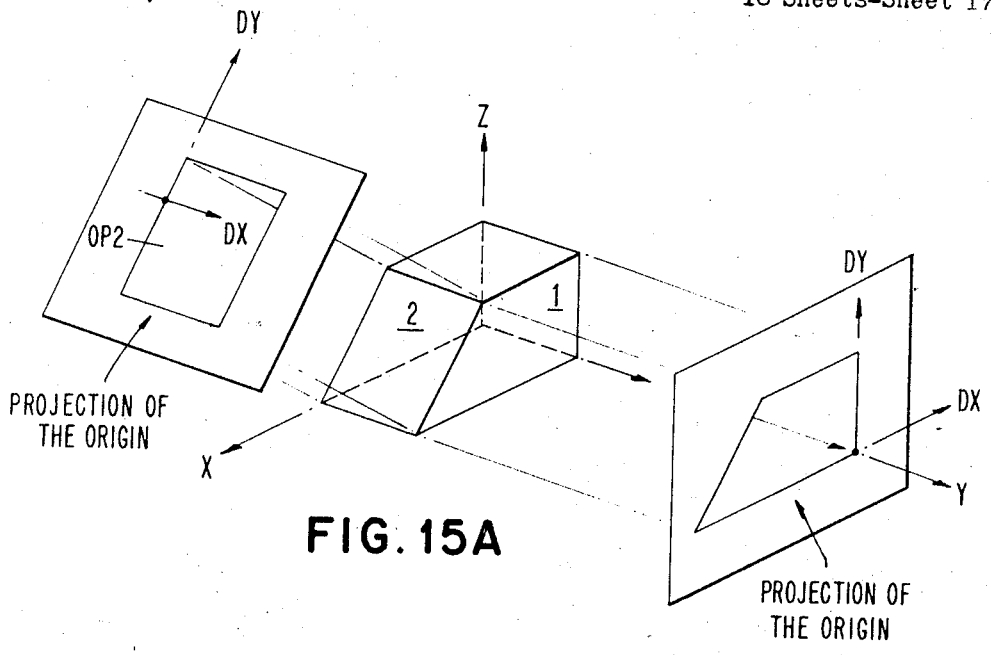
Figure 15B:
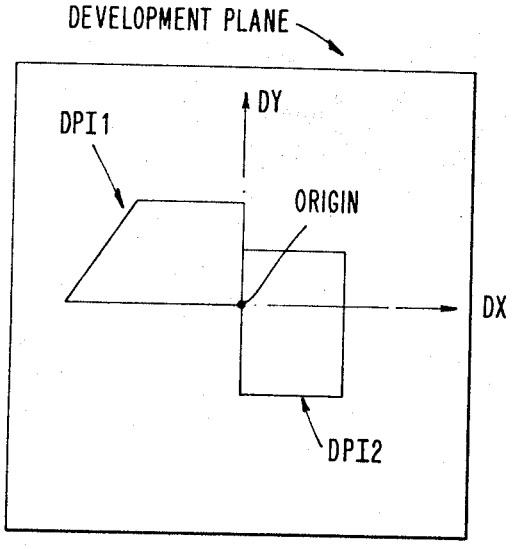
Figure 16:
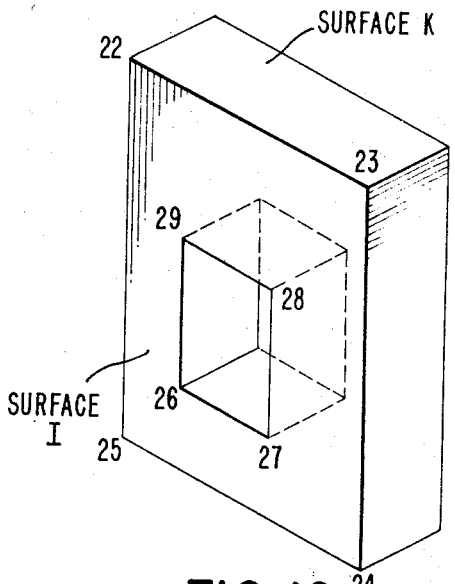
Figure 17A:
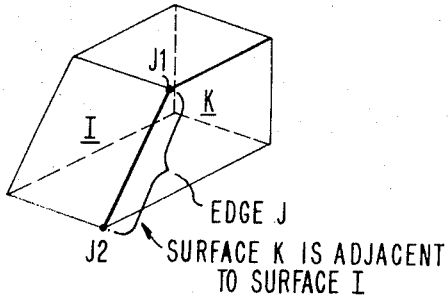
Figure 17B:
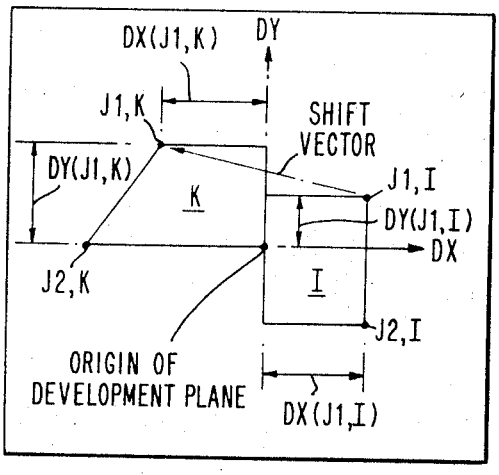
Figure 18:
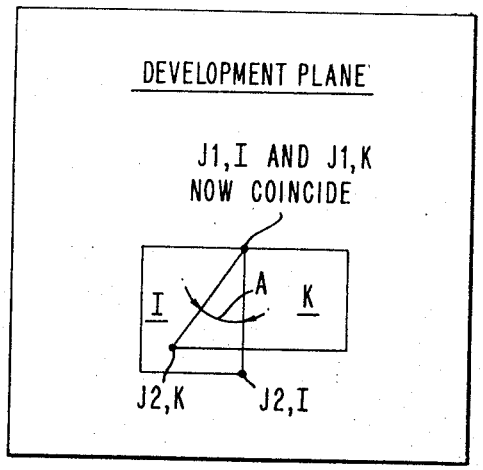
Figure 19:
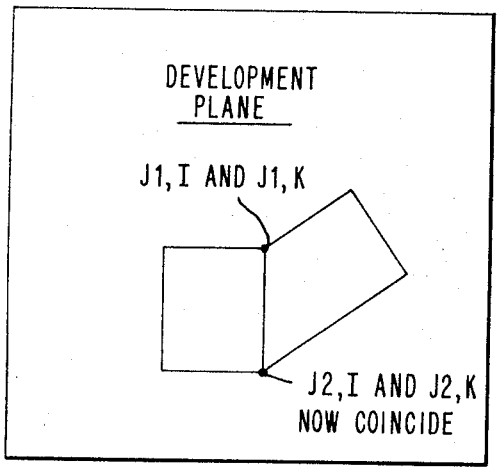
Figure 20A:
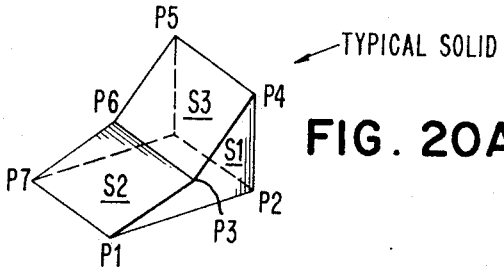
Figure 20B:
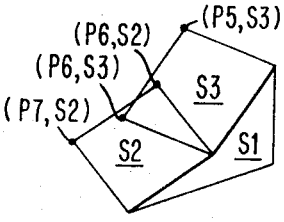

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 401

T912,005

METHOD FOR THE COMPUTER GENERATION OF DEVELOPMENTS

Arthur Appel, Yorktown Heights, and Arthur J. Stein, Peekskill, N.Y., assignors to International Business Machines Corporation, Armonk, N.Y.

Filed June 30, 1972, Ser. No. 267,843

Int. Cl. G06f *15/20*

U.S. Cl. 444—1

18 Sheets Drawing. 37 Pages Specification

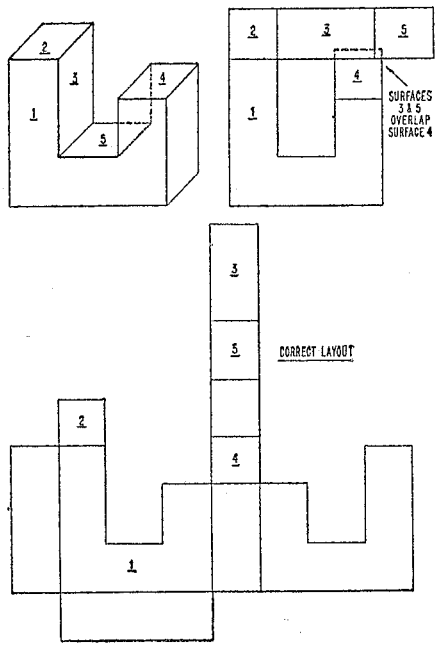

The method for computer developing a three-dimensional object wherein the development state of each plane surface on the object is defined as IDV(N) wherein N is the surface label. There is first read into the computer's memory a vertex list and a topological map which describes the object and then the equations of the planar surfaces on the object are calculated, the equation taking the form $Ax+By+Cz+D=0$, the coefficients A, B, and C also being the direction cosines of a line perpendicular to the surface. There is next calculated the orthographic projection of each surface in the direction of the surface normal. Thereafter, all surfaces adjacent to a first surface being processed are found. The term IDV(1) is taken to equal 1 and the term IDV(N) for all surfaces adjacent to surface 1 is set to 0. At this juncture, a list of surfaces is gone through to find the surface which has a development state $IDV(N)=0$, the true shape of which is derived from the orthographic projection. The projection is shifted and rotated so that the true shape projection lies tangent to the true shape projection of surface having the $IDV(N)=1$. There are then found all surfaces adjacent to the last-named found surface and if $IDV(N)=-1$ for these surfaces, their IDV(N) states are set to 0. The list of surfaces is continued through until a surface is encountered having an $IDV(N)=0$, thus indicating that it must be adjacent to a previously developed surface. Such encountered surface is aligned with a previously developed surface and in this position the surface's development is tested to insure that it does not overlap or interfere with a previously developed surface. The method is iteratively passed through until all surfaces reach an $IDV(N)=1$ state to enable the drawing of the development of the three dimensional object.

METHOD FOR THE COMPUTER GENERATION OF DEVELOPMENTS
Filed June 30, 1972 18 Sheets-Sheet 1
FIG. 1
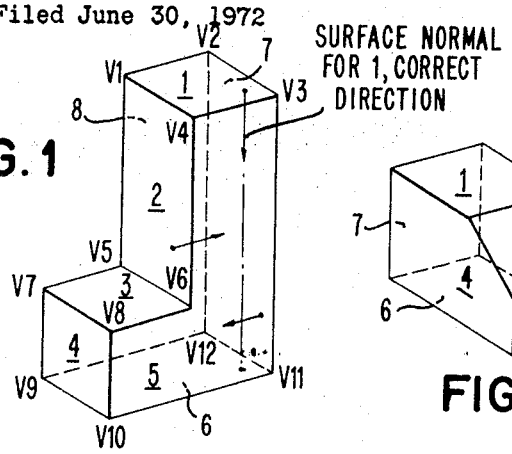
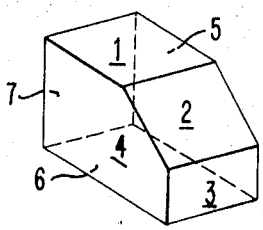
FIG. 2A
FIG. 2B
| STARTING CONDITIONS | |
|---|---|
| SURFACE | IDV (SURFACE) |
| 1 | 1 |
| 2 | −1 |
| 3 | −1 |
| 4 | −1 |
| 5 | −1 |
| 6 | −1 |
| 7 | −1 |
FIG. 2C
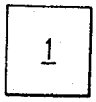
FIG. 2D
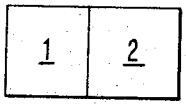
FIG. 2E
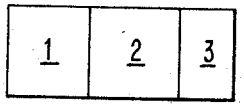
FIG. 2F
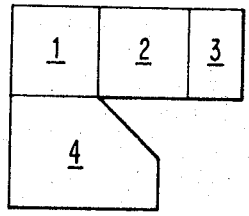
FIG. 2G
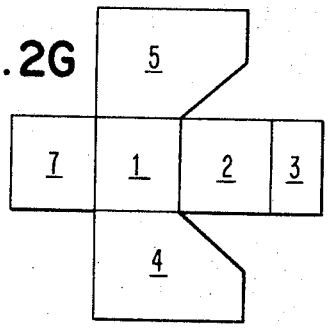
FIG. 2H
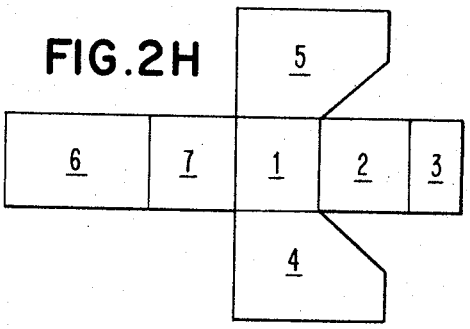
ADJACENT TO 1
| SURFACE | 1 | 2 | 3 | 4 | 5 | 6 | 7 |
|---|---|---|---|---|---|---|---|
| IDV | 1 | 0 | −1 | 0 | 0 | −1 | 0 |
FIG. 2I
ADJACENT TO 2
| SURFACE | 1 | 2 | 3 | 4 | 5 | 6 | 7 |
|---|---|---|---|---|---|---|---|
| IDV | 1 | 1 | 0 | 0 | 0 | −1 | 0 |
FIG. 2J
ADJACENT TO 3
| SURFACE | 1 | 2 | 3 | 4 | 5 | 6 | 7 |
|---|---|---|---|---|---|---|---|
| IDV | 1 | 1 | 1 | 0 | 0 | 0 | 0 |
FIG. 2K

METHOD FOR THE COMPUTER GENERATION OF DEVELOPMENTS

Filed June 30, 1972 18 Sheets-Sheet 2

TRUE SHAPES

METHOD FOR THE COMPUTER GENERATION OF DEVELOPMENTS

Filed June 30, 1972 18 Sheets-Sheet 3

METHOD FOR THE COMPUTER GENERATION OF DEVELOPMENTS

Filed June 30, 1972 18 Sheets-Sheet 4

FIG. 6A
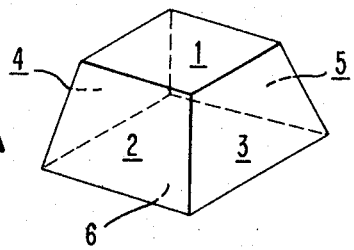
FIG. 6B
| LIST SPECIFICATION | |
|---|---|
| N1 | N2 |
| 1 | - |
| 2 | 1 |
| 3 | 1 |
| 4 | 1 |
| 5 | 1 |
| 6 | 3 |
NOT NECESSARY FOR FIRST SURFACE
ASSOCIATED ADJACENT SURFACE
ORDER IN WHICH SURFACES ARE TO BE PROCESSED
FIG. 6C
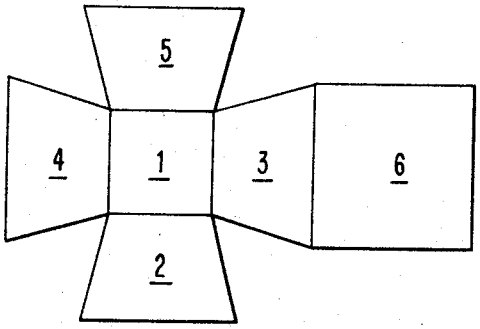
| LIST SPECIFICATION | |
|---|---|
| N1 | N2 |
| 2 | - |
| 3 | 2 |
| 5 | 3 |
| 4 | 5 |
FIG. 6D
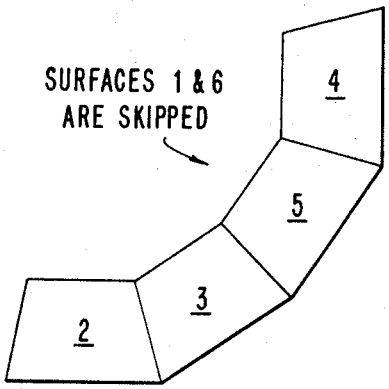
FIG. 6E METHOD FOR THE COMPUTER GENERATION OF DEVELOPMENTS
Filed June 30, 1972 18 Sheets-Sheet 8
FIG. 7A
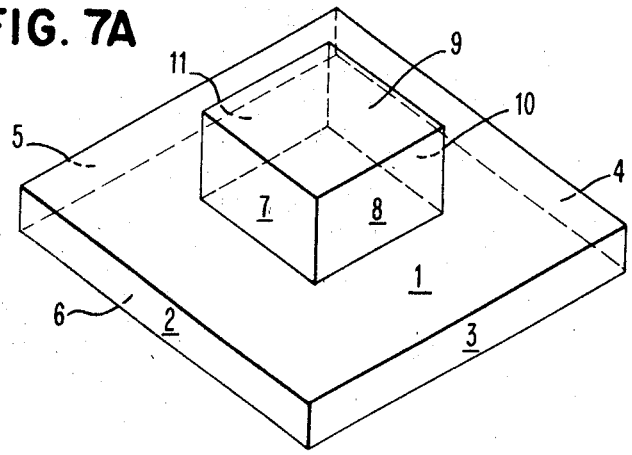
| LIST SPECIFICATION | | |
|---|---|---|
| | N1 | N2 |
| LIST 1 | 1 | - |
| | 2 | 1 |
| | 3 | 1 |
| | 4 | 1 |
| | 5 | 1 |
| | 6 | 2 |
| LIST 2 | 9 | - |
| | 7 | 9 |
| | 8 | 9 |
| | 10 | 9 |
| | 11 | 9 |
FIG.7B
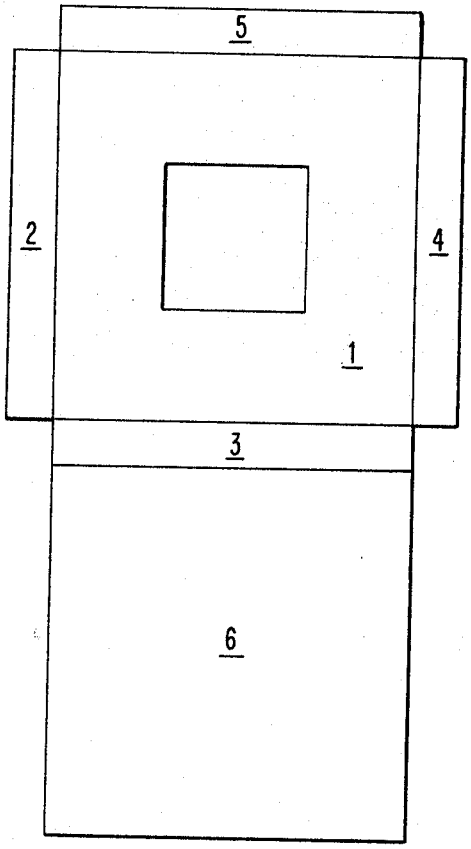
FIG. 7C
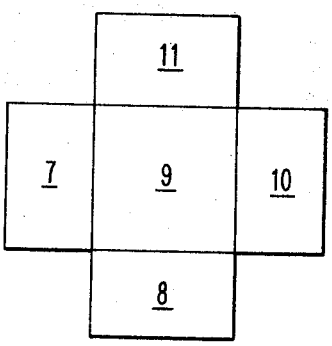
FIG. 7D

METHOD FOR THE COMPUTER GENERATION OF DEVELOPMENTS

Filed June 30, 1972 18 Sheets-Sheet 8

METHOD FOR THE COMPUTER GENERATION OF DEVELOPMENTS

Filed June 30, 1972 18 Sheets-Sheet 10

METHOD FOR THE COMPUTER GENERATION OF DEVELOPMENTS

Filed June 30, 1972 18 Sheets-Sheet 11

METHOD FOR THE COMPUTER GENERATION OF DEVELOPMENTS

Filed June 30, 1972 18 Sheets-Sheet 13

METHOD FOR THE COMPUTER GENERATION OF DEVELOPMENTS

Filed June 30, 1972